United States Patent [19]

Shoyat

[11] Patent Number: 5,050,507
[45] Date of Patent: Sep. 24, 1991

[54] VAULT DOOR AND MIX FOR CASTING SAME

[75] Inventor: Leslie Shoyat, Wadsworth, Ohio

[73] Assignee: Lindsay Concrete Products Co., Inc., Canal Fulton, Ohio

[21] Appl. No.: 481,223

[22] Filed: Feb. 20, 1990

[51] Int. Cl.⁵ .......................... C04B 7/02; E04B 2/84
[52] U.S. Cl. ......................................... 109/83; 106/99
[58] Field of Search ....................... 109/78, 79, 80, 82, 109/83, 84; 106/90, 93, 97, 99, 239

[56] References Cited

U.S. PATENT DOCUMENTS

| | | | |
|---|---|---|---|
| 4,377,977 | 3/1983 | Wurster | 109/83 |
| 4,559,881 | 12/1985 | Lankard | 109/83 |
| 4,565,840 | 1/1986 | Kobayashi | 106/99 |
| 4,588,443 | 5/1986 | Bache | 106/90 |
| 4,593,627 | 6/1986 | Lankard | 109/83 |
| 4,615,280 | 10/1986 | Shoop | 109/83 |

Primary Examiner—Robert L. Wolfe
Attorney, Agent, or Firm—Reese Taylor

[57] ABSTRACT

A burglary resistant cast door assembly for use in a burglary resistant vault is cast of a concrete mix consisting essentially of Type 1 cement from about 21.6 to 25.4 percent by weight; sand from about 31.5 to 37.2 by weight; #8 gravel from about 30.7 to 36.8 by weight; a water reducer from about 0.4 to 0.7 by weight; steel fiber from about 2.3 to 5.1 by weight; and water from about 3.8 to 5.4 by weight.

10 Claims, 3 Drawing Sheets

VAULT DOOR AND MIX FOR CASTING SAME

BACKGROUND OF THE INVENTION

This invention relates in general to burglary resistant doors for use in burglary resistant vaults and relates in particular to a cast door of this general nature in which the door itself is essentially cast from a unique concrete mix.

DESCRIPTION OF THE PRIOR ART

It is well-known in the prior art to provide security enclosures or vaults for the storage of valuables. It is also well-known that particularly the door construction and door frame of such enclosures, which would be most accessible to those seeking unauthorized entry, must be made resistant to forced entry by cutting torches, power drills, impact hammers, and other tools or pressure applying devices, so as to preclude unauthorized entry into the safe or vault.

Traditionally, this burglary resistance is achieved by building the body of the safe including the roof, floor, walls and the door and door frame to the desired thickness to obtain the degree of security required. These components generally are designed to meet burglary resistance standards established by Underwriters Laboratories, Inc., such as particularly UL 608.

These standards are well-known in the art. They require resistance to attack by various tools, such as common hand tools, mechanical or portable electric tools, including carbide drills and any commonly available oxy-fuel gas cutting or welding torch. By resistance to attack is meant that attack by use of the instruments just referred to will not result in forcing an opening greater than ninety-six (96) square inches within a specified period of time. Suffice it to say that, for example, for a Class II door rating, the door will fail to be classified as burglary resistant if the net working time to effect such an opening in the case of Class II is less than one hour.

Many approaches have been taken in attempts to efficiently and economically provide the necessary resistance. For example, multiple metal plates have been employed. Also, in many instances steel casings which are then filled with concrete have been employed.

Some prior art doors also essentially comprise a steel jacket filled with concrete and an example of this general approach can be seen in Lankard U.S. Pat. No. 4,593,627. However, the weight of doors constructed in this fashion is such that the location of the vault will often be restricted by the strength of the structural members of the building in which it is to be installed.

Further improvements in the art have been achieved by providing integrally formed or cast components including the doors and door frames, sometimes employing high steel fiber reinforced concrete. Examples of this approach can be seen in Lankard U.S. Pat. No. 4,559,881 and Shoop U.S. Pat. No. 4,615,280.

While the just-mentioned approach makes it possible to attain the desired level of attack resistance and reduces the weight of the resulting product, it is very difficult to mix the high fiber component and the aggregate in forming doors and door frames of this type.

Also, and in addition to certain problems with the door and door frame, the sill structure usually employed is made of concrete and often requires significant modification of the building in which the vault is to be installed.

Therefore, while the construction illustrated and described above and in the patents just referred to are presumably reasonably effective for the purposes for which they are designed, it is felt that a much improved door and door frame or vestibule can be provided by essentially constructing the door itself of a cast concrete construction made from an improved mix.

SUMMARY OF THE INVENTION

It is accordingly a principal object of this invention to provide a cast concrete burglary resistant door having sufficient attack resistance to qualify as at least a Class II door under UL 608 standards.

It has been discovered that such a door can be provided by forming the door entirely of cast concrete reinforced with one or more drawn steel wire mats.

In furtherance of the principal object of the invention, it has been found that the door can preferably be constructed of a concrete mix consisting essentially of Type 1 cement, sand, #8 gravel, a water reducer, steel fiber and water, and that provision of a door cast of this composition will provide the necessary attack resistance.

It has further been found that a door of this type can match the prior art doors in attack resistance, while involving approximately one-half the weight of a door of comparable size, so that the door can be used in many installations where weight is a factor and where conventionally constructed doors cannot be used.

It has further been found that the principal object of the invention can be facilitated by installing one or more drawn steel wire mats constructed on approximately three-inch centers, with one mat being typically located closely adjacent the front surface of the door at a distance of approximately one inch and a second mat located approximately five inches behind the front surface.

Accordingly, production of an improved cast vault door of the character above described becomes the principal object of this invention with further objects thereof becoming more apparent upon a reading of the following brief specification considered and interpreted in view of the accompanying drawings.

BRIEF DESCRIPTION OF THE PREFERRED EMBODIMENTS

Figure 1:
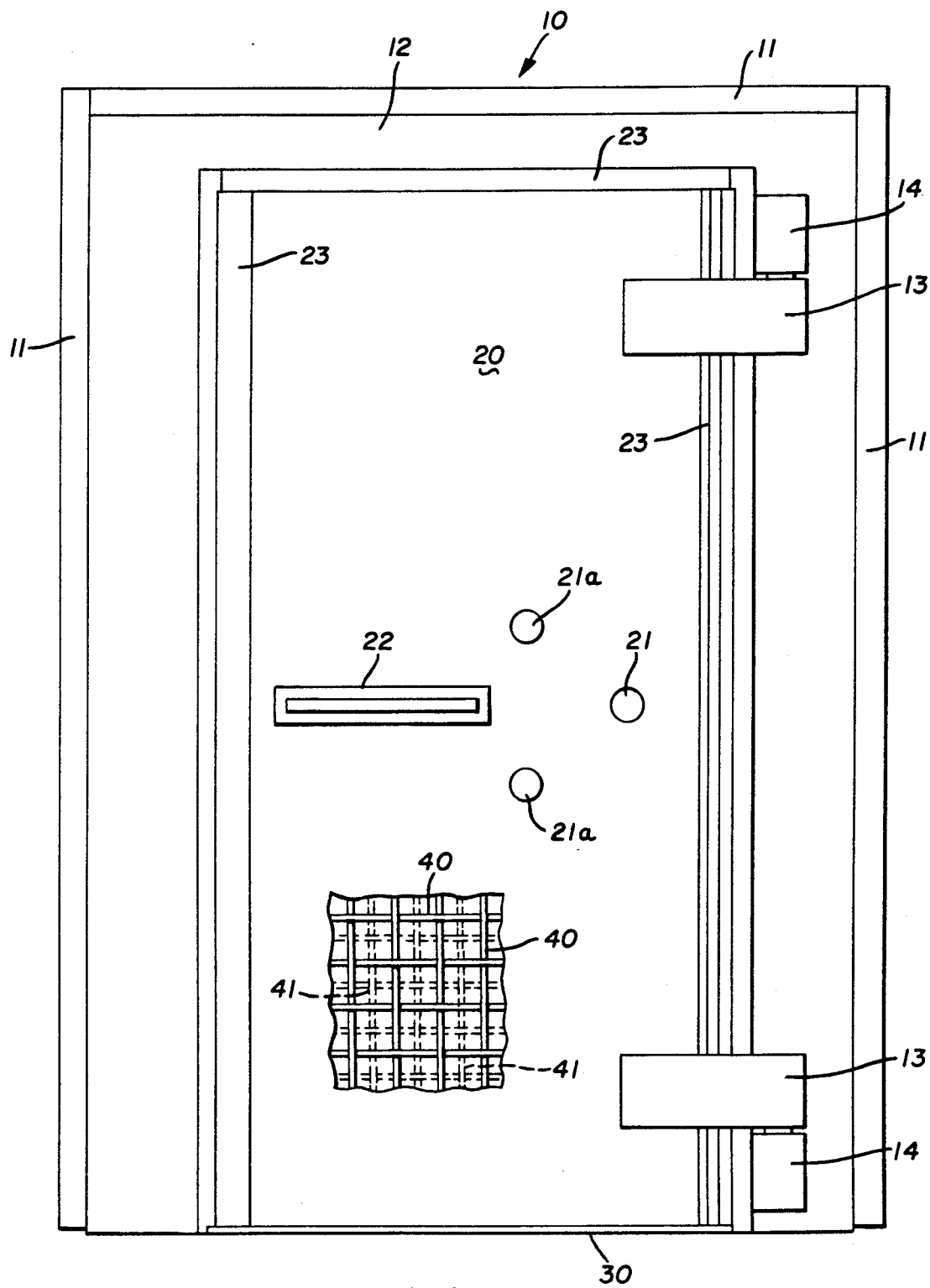
FIG. 1 is a front elevational view of the improved cast door partially broken away.
Figure 2:
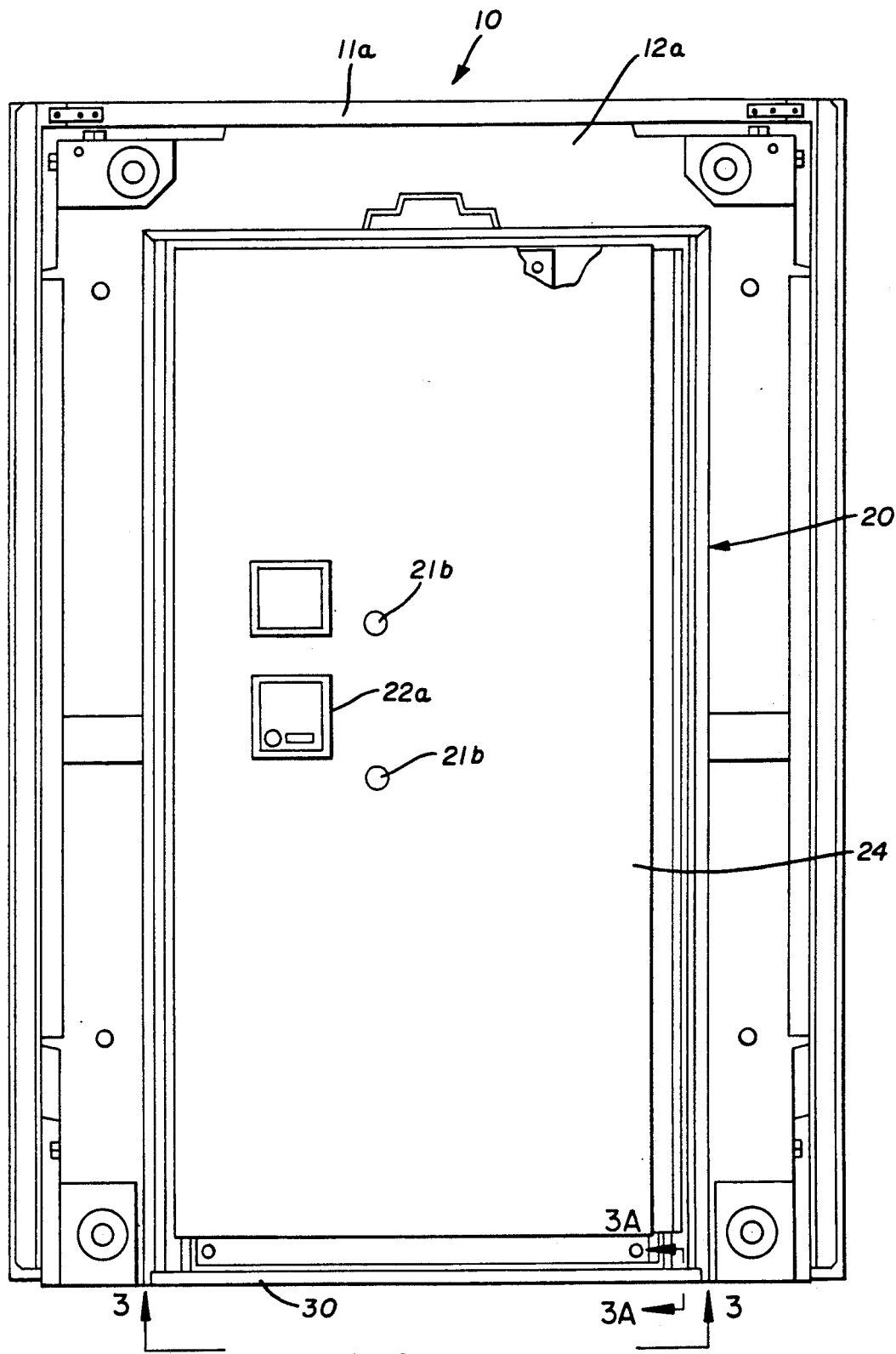
FIG. 2 is a rear elevational view of the improved door of FIG. 1.

Referring first to FIGS. 1 and 2 of the drawings, it will be noted that FIG. 1 is an elevational view of the door and door frame or vestibule taken from the front or outside thereof and partially broken away to illustrate the wire mat reinforcements.

The door, door frame or vestibule and sill assembly, generally indicated by the numeral 10, includes the vestibule or framing to which the door is attached and which is characterized by having an outer finish trim 11 encircling the sides and top of the door opening and a frame or vestibule 12 disposed inwardly of the outer finish trim. The invention is primarily directed to the assembly comprising the door 20 and door frame or vestibule 12, all of which becomes part of the vault or safe itself.

To that end, the door 20 is mounted to the vestibule 12 by means of the hinge plates 13,13 and the vestibule hinge plates 14,14 so that the door may swing open when suitably unlocked.

The door 20 also includes the required conventional ventilation vent 21, dials 21a,21a and a cover trim 23,23 which surrounds the top and both sides of the door. A door handle assembly 22 is also provided, all of which is clearly apparent from FIG. 1 of the drawings. The structure thus far described has not been described in great detail since it is essentially conventional in nature.

FIG. 2 of the drawings is, of course, the reverse of FIG. 1, in that is shows the door looking from the inside of the vault out and, again, the door opening is framed by inner finish trim 11a vestibule walls 12a. The door 20 also has a rear cover or cladding 24 which can be made of metal, such as steel or aluminum, if desired. It should be clearly noted that the door frame or vestibule will be cast from the improved mix just as the door 20.

As noted, FIG. 1 illustrates the hinge plates 13,13 and vestibule hinge plates 14,14 as well as dials 21a,21a, ventilation vent 21 and handle assembly 22. It will be understood by those skilled in the art that threaded inserts will be implaced in the mix during casting to serve as mounting points for the various hardware items.

Similarly, FIG. 2 illustrates various other hardware components such as decorative plugs 21b,21b which are in alignment with dials 21a,21a, vault vent frame 22a, etc., and that suitable threaded inserts could also be employed for such items as require mounting on the rear of the door.

Figure 3:
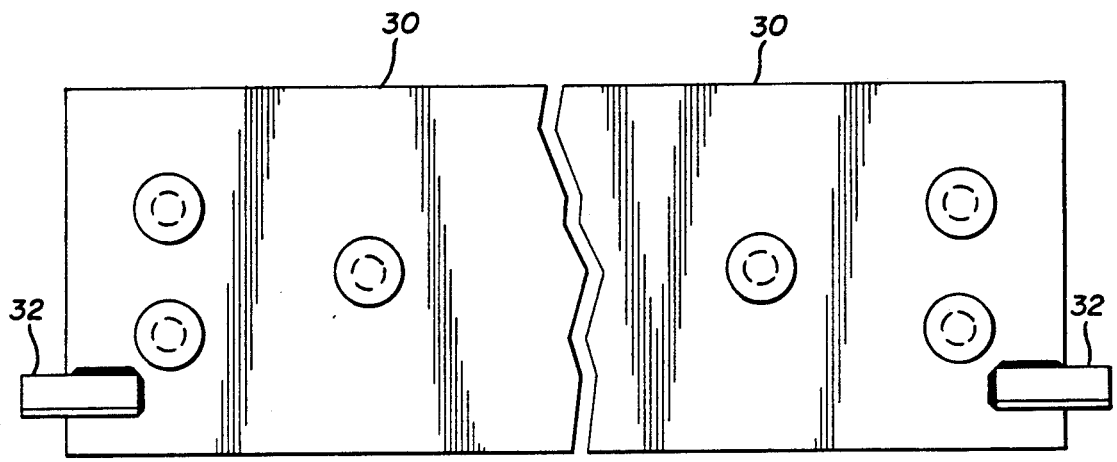
FIG. 3 is a bottom plan view of the improved sill plate taken along the line 3—3 of FIG. 2.
Figure 3A:
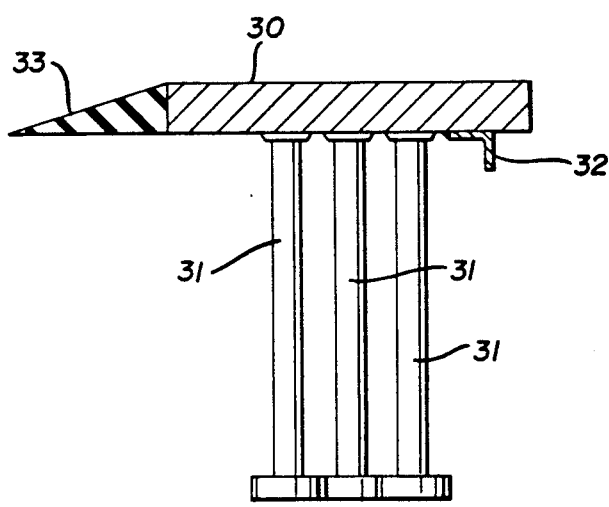
FIG. 3A is an end elevational view of the improved sill plate taken along the line 3A—3A of FIG. 2.

Both FIGS. 1 and 2 of the drawings illustrate the sill plate 30, and FIGS. 3 and 3A of the drawings is a top plan view of that sill plate which is essentially a thin steel plate made of hot rolled steel and which replaces the conventional concrete sill plate commonly utilized. This plate 30 is generally rectangular in plan and sized to be compatible with the door width. A plurality of headed studs 31,31 are provided for securing plate 30 to the vestibule and sill plate angles 32,32 are also provided for installation so that they can pry against the door and prevent chipping of the concrete.

In that regard, it will be noted that use of a sill plate of this type greatly facilitates installation and requires little or no modification of the surrounding structure. Thus, in a typical installation, it is only necessary to install and secure the sill plate 30 to the floor. This is in contrast to the conventional concrete sill which is about three and one-half inches high at its high point. The conventional sill, therefore, usually also requires the construction of a ramp for access to the interior of the vault or requires that a hole be made in the floor.

Referring again to the door itself, FIG. 1 shows the wire mats or grids which enhance the attack resistance of the door. These wire mats or grids 40 and 41 are preferably two in number and comprise a drawn steel wire mat formed from steel having a diameter of about 0.312 and electronically welded. The cross pieces are placed on three-inch centers, and the steel is manufactured to ASTM 187-86 having a minimum of 60,000 psi tensile strength.

Preferable, two of these mats 40 and 41 are employed, one of which will be typically mounted in the frame or mold approximately one inch from the front surface of the door and the second of which will be mounted approximately five inches from the front surface. The precise spacing just referred to is exemplary only and reasonable variations may be considered to be within the scope of the invention. However, spacing substantially of the type described insures that an attacker will encounter the wire sooner so as to inhibit access. It will also be onted that the mats 40 and 41 can be offset as illustrated to further enhance their effectiveness if desired.

It is important to note that the door and door frame or vestibule which is the subject of this invention is a totally cast assembly. In forming the door, the "mix", which will be described in greater detail below, is essentially poured into a frame or mold after the insertion of the wire mats 40 and 41. It is, therefore, important to note that this is, in fact, a cast door assembly formed from a special "mix" and is not a combination steel and concrete door as is taught by much of the prior art and is formed from an improved mix which facilitates the casting process.

The door itself is cast from a concrete mix of the following general type:

TABLE I

| GENERAL MIX FORMULATION | |
|---|---|
| Constituents | Percent by weight |
| Type 1 cement | From about 21.67 to 25.41 |
| Sand | From about 31.52 to 37.17 |
| #8 gravel | From about 30.71 to 36.71 |
| Water reducer | From about 0.42 to 0.64 |
| Steel fiber | From about 2.31 to 5.02 |
| Water | From about 3.80 to 5.31 |

A door and door frame or vestibule assembly cast from a mix within the parameters of this example has been found to be satisfactory in meeting UL standards for Class II doors.

A more specific mix which has been found to be a preferred embodiment follows:

TABLE II

| PREFERRED MIX FORMULATION | |
|---|---|
| Constituents | Percent by weight |
| Type 1 cement | Approximately 23.5 |
| Sand | Approximately 33.4 |
| #8 gravel | Approximately 34.7 |
| Water reducer | Approximately 0.6 |
| Steel fiber | Approximately 3.1 |
| Water | Approximately 4.8 |

A door and door frame or vestibule assembly cast from the mix of Table II has been found to more than satisfy the requirements of UL 608 for Class II doors and to have about fifty percent less mass than most prior art assemblies of similar size.

With regard to the constituents of Tables I and II, Type 1 cement is, of course, well-known in the industry and requires no further definition. Similarly, the sand employed is of a general nature. The gravel is #8 by size, and the water reducer is a chemical admixture which permits reduction in the volume of water required and is generally rated by its solids content. There are a number of usable brands of this material on the market, but a preferable brand for use in this invention will be found to have about a 33% solids solution.

A typical example of such a water reducer is manufactured by Gifford-Hill & Company, Inc. of 2515 McKinney Avenue, Dallas, TX. 75201, and identified as 33% Melment L10A. Other suitable water reducers are manufactured by W. R. Grace & Company and Masterbuilders.

The steel fiber employed is commonly available and preferably has an aspect ratio of between about 40 and 100 and must be steel.

As previously noted, the steel for the wire mats 40 and 41 is approximately 0.312 inch in diameter and is electronically welded. This steel is manufactured to the specifications of ASTM 187-86 and has a minimum 60,000 psi tensile strength.

In producing the door of the present invention, the cement or, in other words, the adhering agent is entirely mixed together with the other constituents and dumped into the form or mold. This will encase the reinforcing mats 40 and 41 and also, of course, any suitable threaded inserts or other items intended to be included in the finished door, such as hinge inserts, anchoring inserts for attaching the frame to the vault walls, conduit, etc., can be placed on or in the mix while still soft so as to be cured into place.

The door constructed according to these specifications will weigh approximately one-third that of conventional doors of a comparable size and will also readily meet appropriate UL 608 standards for attack resistance.

As previously suggested, a further feature of the invention can be seen in FIGS. 1, 2 and 3 of the drawings wherein the improved sill plate 30 is illustrated. As previously noted, this is a thin metal plate made of steel which replaces the usual concrete sill usually employed in installations of this type. Such a sill avoids the difficulty with the conventional sill in that it requires no modification of the building in which the vault is being installed. Also, it is generally necessary with a concrete sill to build a pit or ramp up to it so as to facilitate entry. With Applicant's flat sill plate, all that is usually required is installation of a tapered strip of rubber or carpet 33.

While a full and complete description of the invention has been set forth in accordance with the dictates of the Patent Statutes, it should be understood that modifications can be resorted to without departing from the spirit hereof or the scope of the appended claims.

Thus, while Applicant has set forth a preferred embodiment as required, reasonable experimentation may produce reasonable variations.

Also while, in some instances, particular constituents of the mix have been set forth by way of example, it will be understood that the invention is not intended to be limited in such a fashion so long as the components have comparable performance.

What is claimed is:

1. A burglary resistant cast door assembly for use in a burglary resistant vault, said door comprised of concrete consisting essentially of:

| Constituents | % Weight |
| --- | --- |
| Type 1 cement | About 21.6 to 25.4 |
| Sand | About 31.5 to 37.2 |
| #8 gravel | About 30.7 to 36.8 |
| Water reducer | About 0.4 to 0.7 |
| Steel fiber | About 2.3 to 5.1 |
| Water | About 3.8 to 5.4 |

2. A burglary resistant cast door assembly for use in a burglary resistant vault, comprising:

| Constituents | % Weight |
| --- | --- |
| Type 1 cement | About 23.5 |
| Sand | About 33.4 |
| #8 gravel | About 34.7 |
| Water reducer | About 0.6 |
| Steel fiber | About 3.1 |
| Water | About 4.8 |

3. The burglary resistant cast door assembly of claim 1 or 2 wherein said water reducer is a chemical admixture having a solids content of approximately 33%.

4. The burglary resistant cast door assembly of claim 1 or 2 wherein said steel fiber has an aspect ratio of between 40 and 100.

5. The burglary resistant cast door assembly of claim 1 or 2 wherein at least one drawn steel, electronically welded wire mat is positioned within said door.

6. The burglary resistant cast door assembly of claim 5 wherein a first wire mat is positioned closely adjacent the front surface of said door and a second wire mat is spaced from said first wire mat further remote from the front surface of said door.

7. The burglary resistant cast door assembly of claim 6 wherein said wire mats comprise intersecting cross members on approximately three-inch centers.

8. The burglary resistant cast door assembly of claim 6 wherein said second wire mat is positioned adjacent the rear surface of said door.

9. The burglary resistant cast door assembly of claim 1 or 2 which comprises a door and a door frame or vestibule.

10. The burglary resistant cast door assembly of claim 9 further including a relatively thin steel sill plate.

* * * * *

UNITED STATES PATENT AND TRADEMARK OFFICE
CERTIFICATE OF CORRECTION

PATENT NO.   : 5,050,507
DATED        : September 24, 1991
INVENTOR(S)  : Leslie Shoyat It is certified that error appears in the above-identified patent and that said Letters Patent is hereby corrected as shown below:

In column 3, line 18, delete "is" and substitute therefor --it--.

In column 3, line 20, insert the word "and" between the words "11a" and "vestibule."

In column 4, line 1, delete "Preferable" and substitute therefor --Preferably--.

In column 4, line 11, delete "onted" and substitute therefor --noted--.

Signed and Sealed this

Seventeenth Day of March, 1992

Attest:

HARRY F. MANBECK, JR.

*Attesting Officer*  *Commissioner of Patents and Trademarks*